US008473958B2

(12) United States Patent
Kamay et al.

(10) Patent No.: US 8,473,958 B2
(45) Date of Patent: Jun. 25, 2013

(54) ADJUSTING CLIENT DISPLAY DEVICES BASED ON SETTINGS INCLUDED IN A NOTIFICATION FROM REMOTE VIRTUAL MACHINE HOST PRIOR TO CONNECTION ESTABLISHMENT

(75) Inventors: Yaniv Kamay, Modi' (IL); Arnon Gilboa, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 514 days.

(21) Appl. No.: 12/475,541

(22) Filed: May 31, 2009

(65) Prior Publication Data

US 2010/0306771 A1    Dec. 2, 2010

(51) Int. Cl.
*G06F 9/46* (2006.01)
*G06F 9/455* (2006.01)
*G06F 15/173* (2006.01)
*G06F 15/16* (2006.01)
*G06F 3/00* (2006.01)

(52) U.S. Cl.
USPC .............. 718/104; 718/1; 709/226; 709/228; 709/208; 715/740

(58) Field of Classification Search
None
See application file for complete search history.

(56) References Cited

U.S. PATENT DOCUMENTS

| 8,285,857 | B2* | 10/2012 | Hochmuth et al. | 709/228 |
| 2005/0132091 | A1* | 6/2005 | Shibata | 710/4 |
| 2007/0124474 | A1* | 5/2007 | Margulis | 709/226 |
| 2007/0174410 | A1* | 7/2007 | Croft et al. | 709/208 |
| 2009/0235177 | A1* | 9/2009 | Saul et al. | 715/740 |
| 2010/0115020 | A1* | 5/2010 | Hochmuth et al. | 709/203 |

OTHER PUBLICATIONS

Qumranet, Solid ICE™, Connection Broker, Apr. 2008, 7 pages.
Qumranet, KVM-Kernal-based Virtualization Machine, White Paper, 2006, 5 pages.
Qumranet, Solid ICE™, Overview, Apr. 2008, 15 pages.
Qumranet, Solid ICE™, Provisioning Manager, Apr. 2008, 5 pages.
Qumranet, Solid ICE™, Virtual Desktop Server (VDS), Apr. 2008, 6 pages.

* cited by examiner

*Primary Examiner* — Meng An
*Assistant Examiner* — Bing Zhao
(74) *Attorney, Agent, or Firm* — Lowenstein Sandler LLP

(57) ABSTRACT

A method and system for display device configuration in a VM environment are disclosed. In one embodiment, the method includes determining one or more display devices of a client and transmitting client display information to a host running one or more VMs. Further, a notification is received by the client from the host indicating that display settings of the VM were configured based on the client display information.

22 Claims, 6 Drawing Sheets

ADJUSTING CLIENT DISPLAY DEVICES BASED ON SETTINGS INCLUDED IN A NOTIFICATION FROM REMOTE VIRTUAL MACHINE HOST PRIOR TO CONNECTION ESTABLISHMENT

TECHNICAL FIELD

The embodiments of the invention relate generally to virtual machine systems and, more specifically, relate to display device configuration in a virtual machine environment.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (guest OS) and software applications (processes). Typically, a virtual machine manager (VMM) manages allocation and virtualization of computer resources and performs context switching, as may be necessary, to cycle between various VMs.

A host machine (e.g., computer or server) is typically enabled to simultaneously run multiple VMs, where each VM may be used by a remote client. The host machine allocates a certain amount of the host's resources to each of the VMs. Each VM is then able to use the allocated resources to execute applications, including guest operating systems. The VMM virtualizes the underlying hardware of the host machine or emulates hardware devices, making the use of the VM transparent to the guest operating system or the remote client that uses the VM.

A VM may include one or more applications that generate data (e.g., images, video, etc.) to be displayed at a physical display device of the host machine. Currently, there is no mechanism that ensures a correspondence between display settings of the physical display device (e.g., resolution, orientation, display position, color depth, sub-pixel order, etc.) and those of the VM. As a result, the quality of rendered data is negatively affected.

Further, a VM may run in a remote server environment, in which a centralized server is partitioned into multiple VMs that may, for example, host virtual desktops, thereby providing a desktop for an end user of a remote client device. However, currently there is no mechanism that would ensure a correspondence between display settings of the VM that provides a desktop and the settings of the display devices of the remote client that render the desktop for the end user.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
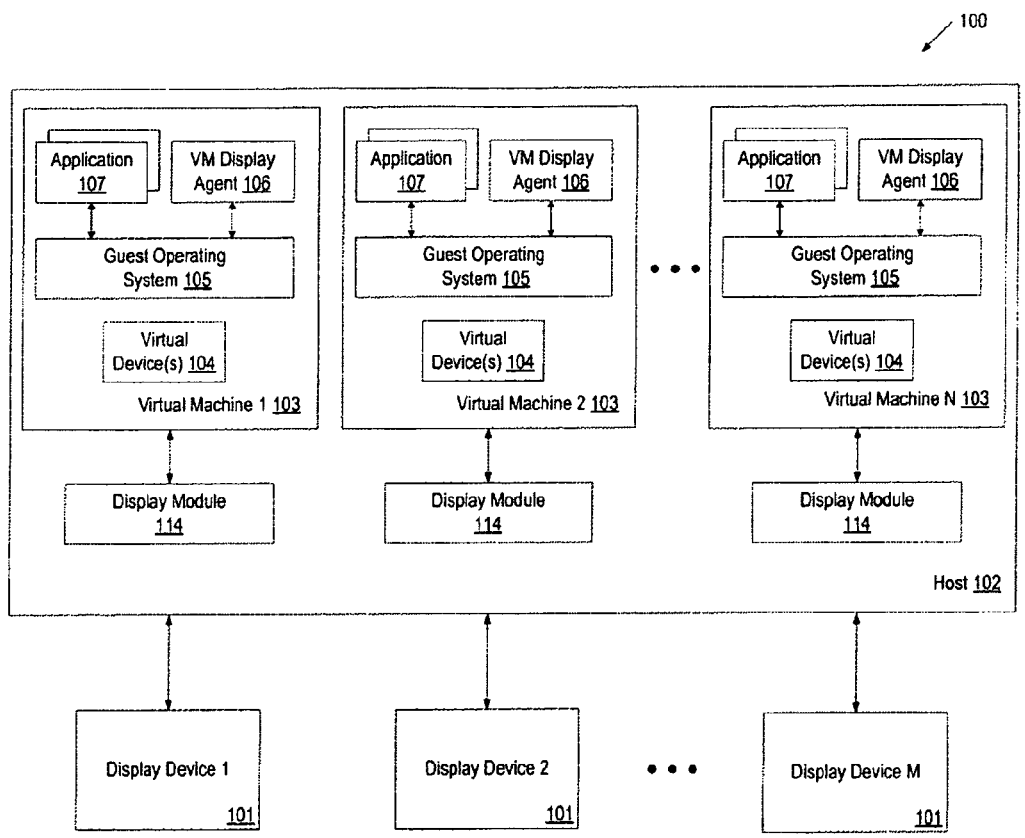
FIG. 1 is a block diagram of a system for providing display system device configuration in a local host environment according to one embodiment of the invention.

A method and system for configuring display devices in a virtual machine (VM) system are described herein. In one embodiment, a method of configuring display devices in a VM system includes receiving information of a physical display system. This physical display system information may identify one or more devices in the physical display system and specify current settings of each display device. In one embodiment, in addition to the current settings, the physical display system information also specifies the settings that are supported by the display devices. Based on the physical display system information, the display device settings of the VM are adjusted to fit the specific requirements of the user. In one embodiment, the adjustment also takes into account the abilities and/or limitations of the specific VM.

The above mechanism may be applicable to a local host environment, in which the display device settings of the VM are adjusted based on the settings of the display system of the host. In addition, or alternatively, the above mechanism may be applicable to a remote host environment, in which the display settings of the VM are adjusted based on the settings of the display system of a client coupled to a VM host via a network.

In the following description, numerous details are set forth to provide a more thorough explanation of the embodiments of the present invention. It will be apparent, however, to one skilled in the art, that the present invention may be practiced without these specific details. In some instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "deleting", "configuring", "enabling", "disabling", "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 is a block diagram of a system 100 that provides display device configuration in a local host environment according to embodiments of the invention. System 100 includes one or more display devices 101 communicatively coupled to a host computer 102. The display devices 101 may include such devices as a computer monitor, a graphics card, a display adapter, or any other device that is involved in rendering data on a screen. The display devices 101 are part of the hardware platform of the host 102. The hardware platform may include a memory, a processor, and other hardware of the host machine 102.

Computer 102 hosts one or more VMs 103, each having one or more applications 107. An application 107 may be executed and hosted by an operating system within VM 103. Such an operating system in VM 103 is also referred to as a guest operating system 105. Multiple guest operating systems and the associated VMs may be controlled by another operating system, known as a host OS or a virtual machine monitor (VMM) for managing the hosted VMs. The VMM may also be referred to as a hypervisor or a kernel-based virtual machine (KVM).

A guest OS 105 may be of the same or different type with respect to the host OS. For example, a guest OS may be a Windows™ operating system from Microsoft and a host OS may be a Linux operating system available from Red Hat. In addition, the guest OSes 105 can be of the same or different types.

VM 103 can be any type of virtual machines, such as, for example, hardware emulation, full virtualization, para-virtualization, and operating system-level virtualization virtual machines. Different VMs 103 hosted by computer 102 may have the same or different privilege levels for accessing different resources.

In one embodiment, each VM 103 has one or more virtual devices 104 that emulate physical devices such as display devices. A virtual device 104 may be in the form of a driver supported by a relevant guest OS 105, or some other software emulating the functionality of a physical device. The virtual device 104 emulating the functionality of a display device may have display device settings that may include, for example, resolution, display position, orientation, color depth, sub-pixel order, etc. Options for the settings of the virtual device 104 may be limited to those supported by the guest OS 105.

In one embodiment, the host 102 includes display modules 114 associated with individual VMs 103. The display modules 114 may be part of the VMM or a hardware emulation layer, plugins for the VMM or the hardware emulation layer, or independent modules running on top of the VMM. In another embodiment, one display module 114 is provided to operate with all VMs 103 of the host 102. Prior to establishing a display connection between the VM 103 and display devices 101, the display module 114 collects the settings of the currently active display devices 101 and sends them to the VM 103. These settings may be updatable by a user of the host 102 or set by the host 102 based on default parameters or specific criteria. In one embodiment, in addition to the current settings, the display module 114 also collects alternative settings that are supported by the active display devices 101, and sends them to the VM 103.

In one embodiment, each VM 103 includes a VM display agent 106 that configures the display device settings of the VM 103. The display device settings of the VM are the settings of the virtual devices 104 that emulate display device functionality. The VM display agent 106 receives data identifying active display devices 101 and the settings of the active display devices 101 from the display module 114, determines which of the display devices 101 are currently inactive, and disables corresponding virtual devices 104. For each active display device 101, the VM display agent 106 determines whether the settings of a corresponding virtual device 104 differ from the current settings of the active display device 101. If so, the VM display agent 106 updates the settings of the virtual device 104 with the current settings of a corresponding display device 101.

In another embodiment, the display module 114 collects alternative settings of the active display devices 101, in addition to the current settings of the active display devices 101.

The alternative settings may be the settings supported by the specific display device 101 and may be specified by the user or predefined. The alternative settings may also be ordered by a priority. In this embodiment, prior to making the update, the VM display agent 106 determines whether the corresponding virtual device 104 supports the current settings of the active display device 101. If so, the settings of the virtual display device 104 are updated with the current settings of the active display device 101. Alternatively, if the virtual display device 104 does not support the current settings of the active display device 101, the VM display agent 106 determines whether the received data contains one or more alternate settings. If the received data contains one or more alternate settings, the VM display agent 106 determines which alternate settings have the highest priority and then determines if those alternate settings are supported by the virtual display device 104. If the alternate settings are supported, the VM display agent 106 updates the settings of the virtual device 104 with the alternate settings. If the alternate settings with the highest priority are not supported, then the VM display agent 106 looks for additional alternates for the settings in order of priority. The VM display agent 106 continues this process until the virtual display device 104 has been updated or there are no additional alternate settings in the received data.

In yet another embodiment, the VM display agent 106 does not make any updates to the settings of the virtual device 104 if the current settings of the active display device 101 are not supported.

Next, the VM display agent 106 sends a notification to the display module 114, indicating that the VM settings have been updated based on the settings of the active display devices 101. In one embodiment, the notification of the VM display agent 106 also includes the current settings of the virtual devices 104, which can be used by the display module 114 to update the settings of the display device 101 if needed to match to the settings of the virtual display devices 104. The communication between the VM 103 and the display devices 101 then takes place using one or more channel connections (e.g., a separate channel can be used for each active display device 101 or a single channel can be used for more than one active display device 101).

In another embodiment, the notification of the VM display agent 106 is in the form of an acknowledgment and it does not include the current settings of the virtual devices 104. In this other embodiment, after receiving the notification from the VM display agent 106, the display module 114 completes the pre-connect stage, and establishes one or more channel connections between the VM 103 and the display devices 101. The VM display agent 106 can then send the current display settings of the VM 103 (e.g., in the form of the "MODE" operation). If these settings are different from the current settings of the display devices 101, the display module 114 reconfigures the current settings of the display devices 101 accordingly. Subsequently, if during the active display connection, the display settings of the VM 103 are changed (e.g., in response to a user request or a specific event), the VM display agent 106 can send the new display settings of the VM 103 (e.g., in the form of the "MODE" operation), and the display module 114 can reconfigure the current settings of the display devices 101 accordingly.

In one embodiment, the current settings of the display devices 101 are changed during the active display connection (e.g., in response to a user request via GUI or by an external module). The display module 114 detects the change (e.g., by periodically checking the settings of the display devices 101), collects current settings of the display devices 101 (and optionally the supported settings of the display devices 101), and sends them to the VM display agent 106. In response, the VM display agent 106 adjusts the display settings of the VM 103 as discussed above, and sends a notification to the display module 114. In one embodiment, the display module 114 then ensures that the settings of the display devices 101 match the VM display settings.

Figure 2:
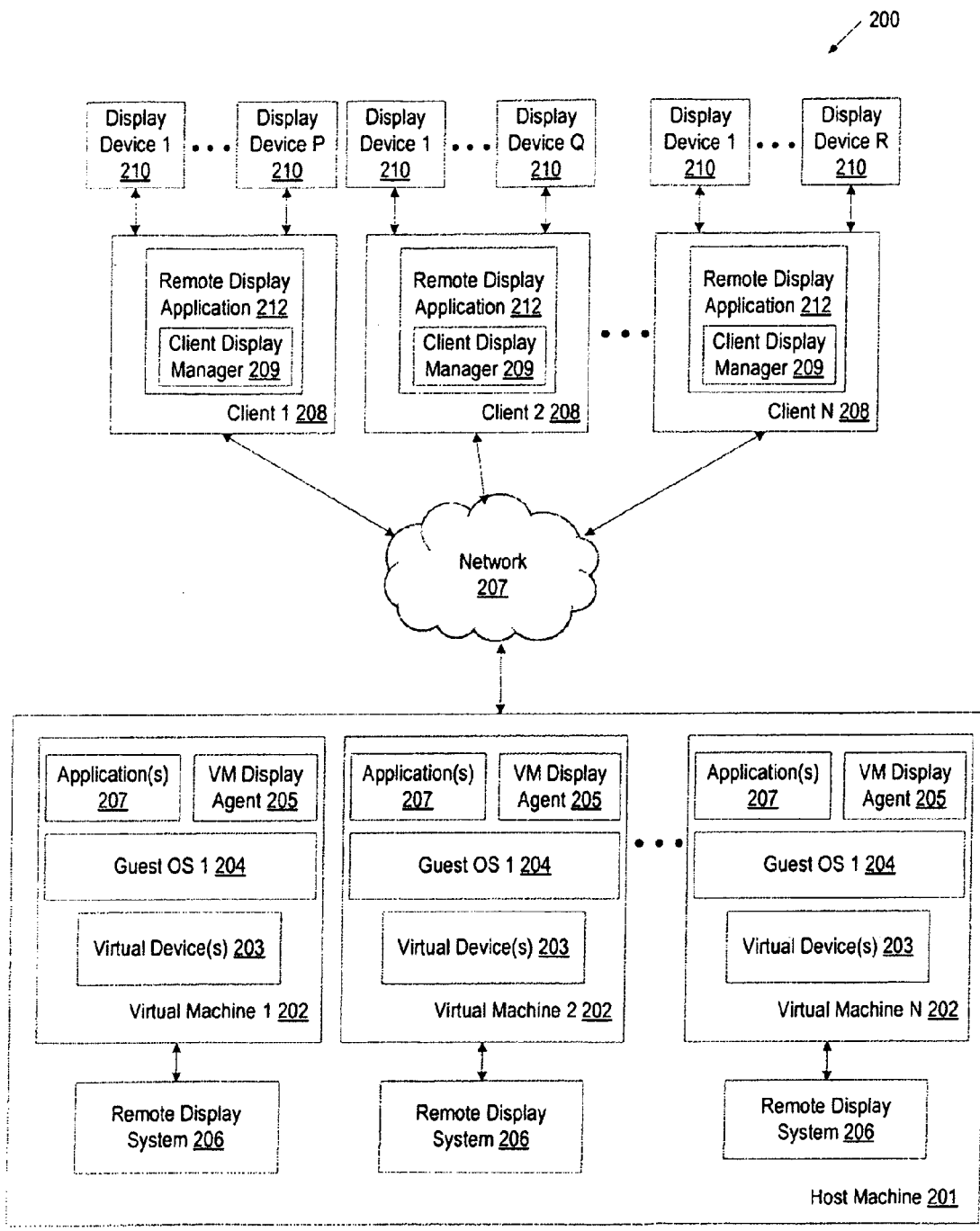
FIG. 2 is a block diagram of a system for providing display system device configuration in a remote host environment according to one embodiment of the invention.

FIG. 2 is a block diagram illustrating a system 200 for providing display system device configuration in a remote host environment according to one embodiment of the invention. System 200 includes one or more clients 208 communicatively coupled to a host machine or a cluster of host machines 201 over a network 207. Network 207 may be a local area network (LAN) or a wide area network (WAN) and may be a combination of one or more networks. Client 208 may be any computer system in communication with host machine 201 for remote execution of applications at host machine 201. Each client 208 is communicatively coupled to one or more client display devices 210. The client display devices 210 may include such devices as a computer monitor, a graphics card, a display adapter, or any other device that can store display information or render data on a screen. The settings of the client display device 210 may be updatable based on input provided by the user of the client 208 or by the client 208 itself. The settings of the client device 210 may include display position, orientation, color depth, sub-pixel order, or any other aspects of display resolution. In one embodiment, the client 208 hosts a remote display application 212 that renders data received from the host 201 and presents it on the display device 210. The remote display application 208 may be a thin client application such as a browser application.

The host machine 201 is configured to host one or more VMs 202, each having a guest operating system 204. Multiple guest OSes and the associated VMs may be controlled by another operating system (also referred to as a host OS, VMM, hypervisor, or KVM engine). Each VM 202 may include one or more applications hosted by corresponding guest OSes 204. Each VM 202 can communicate to one or more clients 208. In one embodiment, each virtual machine 202 hosts or maintains a desktop environment providing virtual desktops for remote clients 208. In some embodiments, client 208 may be a thin client with sufficient resources to enable a user to interact with a virtual desktop provided by VM 202. A virtual desktop can represent an output (e.g., an image to be displayed) generated by a desktop application 207 running within VM 202. Graphics data associated with the virtual desktop can be captured and transmitted to client 208, where the virtual desktop may be rendered and presented by the remote display application 212. In one embodiment, VM 202 communicates with remote display application 212 using a remote access protocol (e.g., Remote Desktop Protocol (RDP), Simple Protocol for Independent Computing Environments (SPICE™ from Red Hat, etc.) that allows for connection between VM 202 and display devices 210.

In one embodiment, the remote display application 212 includes a client display manager 209 that collects client display information. The client display information may include a list of all the client display devices 210 which are active on the client 208, and the settings of each client display device in the list. In one embodiment, in addition to the current settings, the client display information also includes alternative settings that are supported by the active client display devices 210. In one embodiment, client display manager 209 collects the client display information in a "pre-connect" stage (prior to establishing display connections with the VM 202). Further, client display manager 209 connects to the host through the network 207, and sends the client display information to the host 201.

In one embodiment, the host 201 includes a remote display system 206 for each VM 202. The remote display system 206 may be part of the VMM or a hardware emulation layer, or run on top of the VMM. The remote display system 206 receives the client display information sent by the client 208 and passes the client display information to a VM display agent 205 of the VM 202. The VM display agent 205 uses the client display information to update the settings of virtual devices 203. In one embodiment, the VM display agent 205 disables virtual devices 203 that do not have corresponding client devices in the list of active client display devices, enables virtual devices 203 that correspond to active client display devices 210 from the list, and then, in one embodiment, updates the settings of the virtual devices 203 with the settings of the active client display devices 210. Alternatively, prior to updating the settings of the virtual devices 203, the VM display agent 205 determines whether an enabled virtual device 203 supports the current settings of the corresponding client display device 210. If so, the settings of the virtual device 203 are updated with the current settings of the corresponding client display device 210. If not, the VM display agent 205 determines whether the client display information contains one or more alternate settings for the virtual device 203. If alternate settings are specified, the VM display agent 205 determines which alternate settings have the highest priority and whether those alternate settings are supported. If the alternate settings are supported, the VM display agent 205 updates the settings of the virtual device 203 with the alternate settings. If the alternate settings are not supported, then the VM display agent 205 looks for additional alternate settings in order of priority. The VM display agent 205 continues this process until the settings of the virtual device 203 have been updated or there are no additional alternate settings in the received information.

In yet another embodiment, the VM display agent 205 does not make any updates to the settings of the virtual device 203 if the settings contained in the client display information are not supported.

The VM display agent 205 then sends a notification to the remote display system 206, indicating that the VM settings have been updated based on the settings of the active client display devices 210. In one embodiment, the notification of the VM display agent 205 also includes the current display settings of the VM 202. The remote display system 206 receives the notification from the VM display agent 205 and passes the notification to client 208 through network 207. At client 209, the client display manager 209 ensures that the settings of the active client display devices 210 correspond to the received settings of the VM 202, and facilitates communication between the VM 202 and the client display devices 210 via one or more channel connections (e.g., a separate channel for each client display device 210 or a channel for multiple client display devices 210).

In another embodiment, the notification of the VM display agent 205 is in the form of an acknowledgment and it does not include the current display settings of the VM 202. In this other embodiment, the remote display system 206 passes the notification of the VM display agent 205 to client 208, where the client display manager 209 completes the pre-connect stage, and establishes one or more channel connections between the VM 202 and the display devices 210. The VM display agent 205 can then send the current display settings of the VM 202 (e.g., in the form of the "MODE" operation). If these settings are different from the current settings of the display devices 210, the client display manager 209 reconfigures the current settings of the display devices 210 accordingly. Subsequently, if during the active display connection, the display settings of the VM 202 are changed (e.g., in response to a user request or a specific event), the VM display agent 205 can send the new display settings of the VM 202 (e.g., in the form of the "MODE" operation), and the client display manager 209 can use these new settings to reconfigure the current settings of the client display devices 210.

In one embodiment, the current settings of the display devices 210 are changed during the active display connection (e.g., in response to a user request via client GUI or by an external module). The client display manager 209 detects the change (e.g., by periodically checking the settings of the display devices 210), collects current settings of the display devices 210 (and optionally the supported settings of the display devices 210), and sends them to the VM display agent 205. In response, the VM display agent 205 adjusts the display settings of the VM 202 as discussed above, and sends a notification to the client. In one embodiment, the client display manager 209 then ensures that the settings of the display devices 210 match the VM display settings.

Accordingly, systems 100 and 200 automatically match display device settings of the VM with preferred settings of the physical display system that renders data generated by the VM. When performing the matching, systems 100 and 200 take into account the abilities and/or limitations of the VM and the physical display devices. As a result, the user involvement is minimized and the quality of data presentation is improved.

Figure 3:
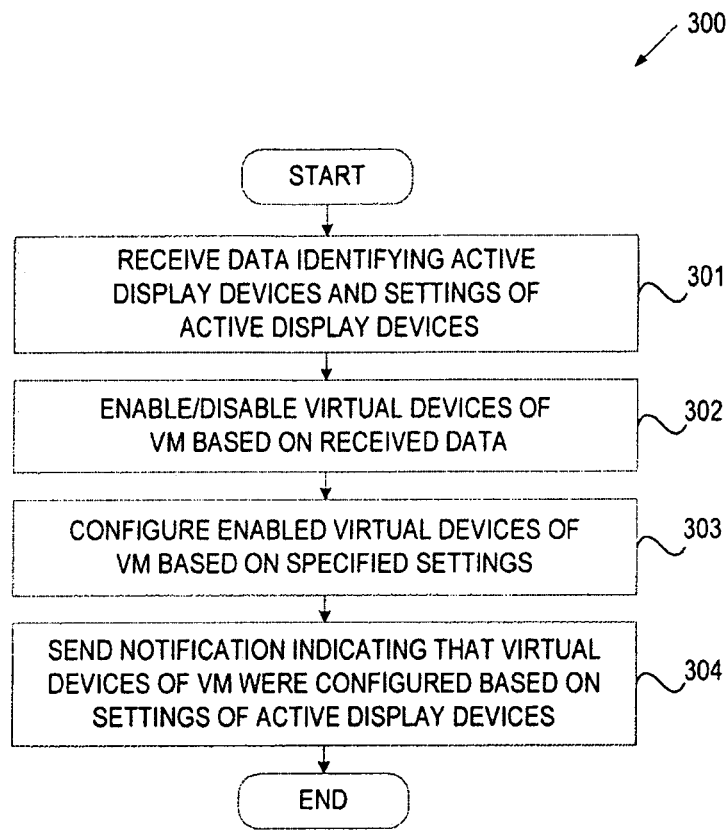
FIG. 3 is a flow diagram illustrating a method for providing display system device configuration in a local host environment according to an embodiment of the invention.

FIG. 3 is a flow diagram illustrating a method for providing display device configuration in a local host environment according to one embodiment of the invention. Note that method 300 may be performed by processing logic which may include software, hardware, or a combination of both. For example, method 300 may be performed by system 100 of FIG. 1.

Method 300 begins at block 301 where a VM display agent receives a list of active devices of the host's display system and current settings of the active display devices. The list may be received from a display module which collects current settings of the host's display system during the "pre-connect" stage (prior to establishing display connections between the VM and the display devices of the host). The display module may be part of, or a plugin for, the VMM or a hardware emulation layer, or be an independent module running on top of the VMM. In one embodiment, the list also includes alternative settings supported by the active display devices.

At block 302, the VM display agent determines which active display devices are included in the list, enables corresponding virtual display devices, and disables virtual display devices that do not have corresponding devices in the list. At block 303, the VM display agent configures the settings of enabled virtual display devices according to the received data. In one embodiment, the VM display agent first determines whether the specified settings are supported. If so, the VM display agent updates the settings of the virtual display devices with the specified device settings. If not, the VM display agent determines which alternate desired device settings have the highest priority. If the alternate desired device settings are supported, the virtual display device is updated with the alternate settings. If the alternate desired device settings are not supported, the VM display agent continues to make the determination for each of the alternate device settings provided in order of priority until finding alternate device settings which are supported by the virtual display device or until exhausting the list. If the list does not include alternate device settings that are supported by the virtual display device, the VM display agent uses default settings for the virtual display device.

At block 304, the VM display agent sends a notification to the display module, indicating that the VM settings have been updated based on the settings of the active display devices. In one embodiment, the notification of the VM display agent also includes the resulting display settings of the VM. The display module then compares the received settings of the VM with the settings of the host display devices, and if they are different, updates the settings of the host display devices with the settings of the VM. The communication between the VM and the host display devices can then take place via one or more channel connections.

In another embodiment, the notification of the VM display agent is in the form of an acknowledgment and it does not include the current settings of the VM. In this other embodiment, after receiving the notification from the VM display agent, the display module completes the pre-connect stage, and establishes one or more channel connections between the VM and the display devices. The VM display agent then sends the current display settings of the VM (e.g., in the form of the "MODE" operation). If these settings are different from the current settings of the display devices, the display module reconfigures the current settings of the display devices accordingly. Subsequently, if during the active display connection, the display settings of the VM are changed, the VM display agent sends the new display settings of the VM (e.g., in the form of the "MODE" operation), and the display module reconfigures the current settings of the display devices accordingly.

Figure 4:
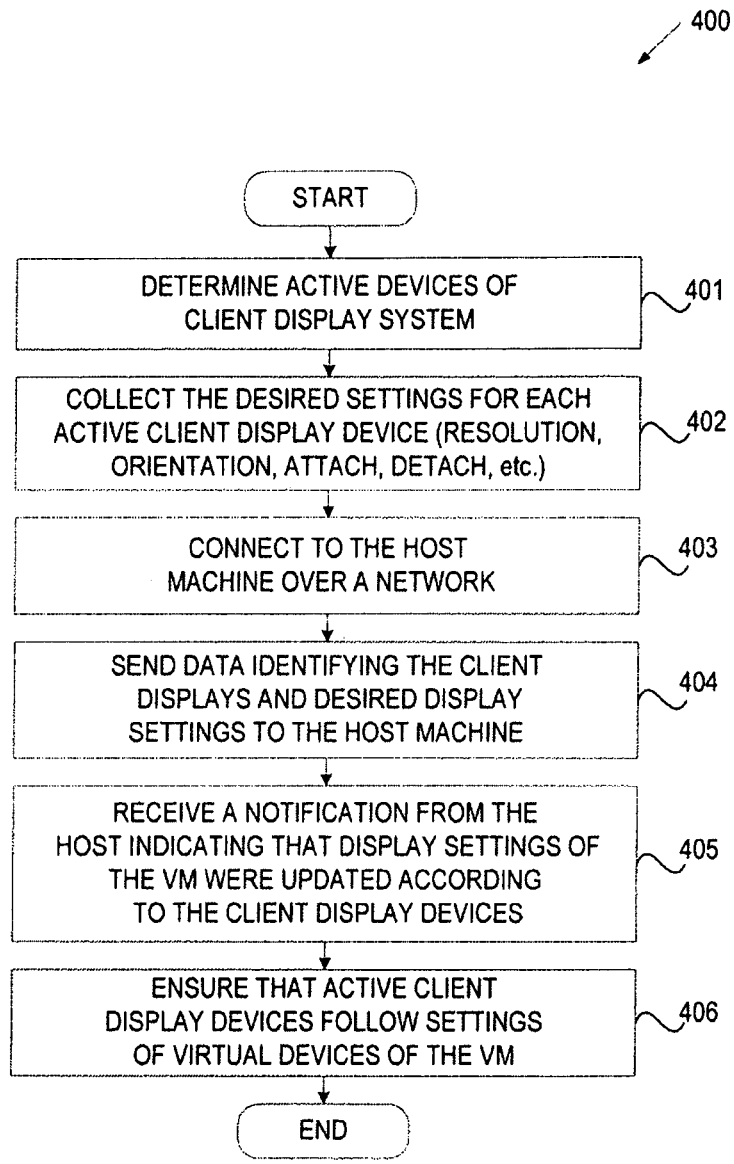
FIG. 4 is a flow diagram illustrating a client-based method for providing display system device configuration in a remote host environment according to an embodiment of the invention.

FIG. 4 is a flow diagram illustrating a client-side method for providing display device configuration in a remote host environment according to one embodiment of the invention. Note that method 400 may be performed by processing logic which may include software, hardware, or a combination of both. For example, method 400 may be performed by client 208 of FIG. 2.

Method 400 begins at block 401 where a client display system manager hosted by a client determines, during the pre-connect stage, which client display devices are currently active, and creates a list of these client display devices. At block 402, the client display manager collects the display settings for each active client display device and adds the settings to the list of client display devices. The display settings include one or more of display position, orientation, color depth, sub-pixel order, or any other aspects of display resolution. In one embodiment, in addition to the current settings, the client display manager also collects alternative settings that are supported by the active client display devices, and adds the alternative settings to the list.

At block 403, the client connects to the host machine over a network. At block 404, the client transmits a list including the active client display devices and the desired display settings to the host over the network (and optionally the alternate settings supported by the client display devices). The client then waits for a notification from the host that the display settings of the relevant VM have been configured based on the client display device settings. At block 405, the client receives the notification from the host indicating that the VM settings have been updated based on the settings of the active client display devices.

In one embodiment, the notification also includes the current display settings of the VM, and at block 406, the client ensures that the settings of the client display devices match the display settings of the VM. The communication between the VM and the client display system devices can then take place via one or more channel connections.

In another embodiment, the notification is in the form of an acknowledgment and it does not include the current settings of the VM. In this other embodiment, after receiving the notification, the client establishes one or more channel connections between the VM and the client display devices and waits for the MODE operation message from the VM that includes the current display settings of the VM. If the VM settings are different from the current settings of the client display devices, the client reconfigures the current settings of the client display devices. Subsequently, if during the active display connection the client receives the MODE operation message from the VM with new display settings of the VM, the client reconfigures the current settings of the client display devices accordingly.

Figure 5:
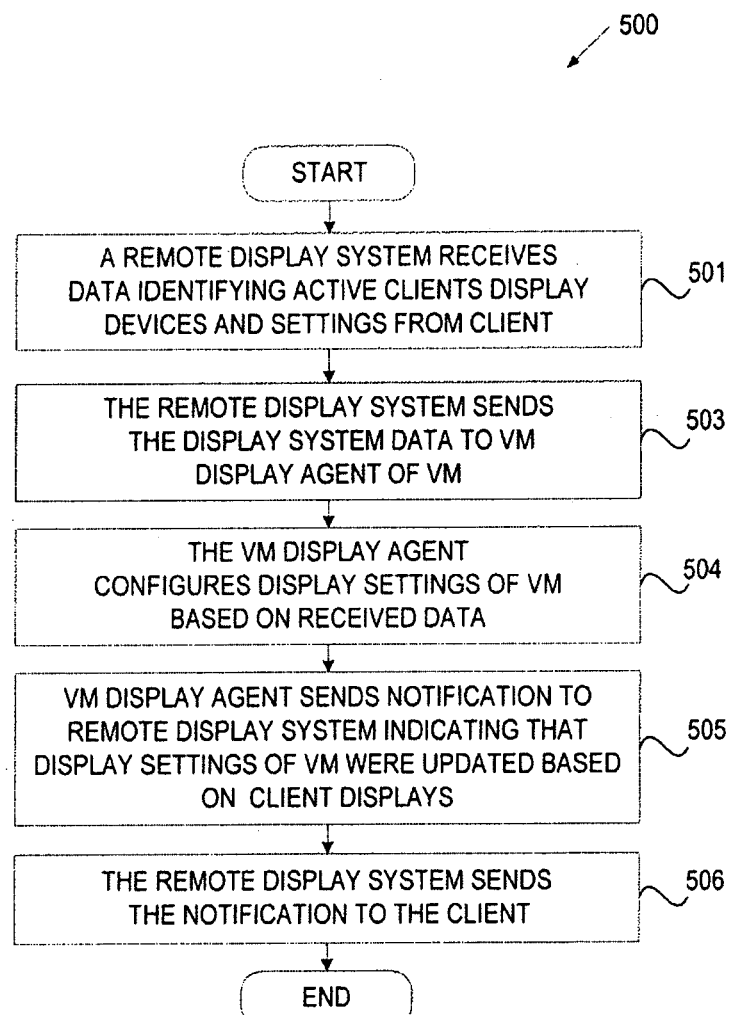
FIG. 5 is a flow diagram illustrating a server-based method for providing display system device configuration in a remote host environment, in accordance with one embodiment of the invention.

FIG. 5 is a flow diagram illustrating a server-side method for providing display device configuration in a remote host environment. Note that method 500 may be performed by processing logic which may include software, hardware, or a combination of both. For example, method 500 may be performed by host machine 201 of FIG. 2.

Method 500 begins at block 501 where a remote display system in a host receives display system data from a client. The display system data may include a list of active display devices on the client and the settings for each active client device (e.g., the current settings and optionally the supported settings). The settings may include display position, orientation, color depth, sub-pixel order, or any other aspects of display resolution.

At block 502, the remote display system sends the client display system data to the VM display agent of the VM. At block 504, the VM display agent receives the client display system data and configures the display settings of the VM. In one embodiment, the VM display agent enables virtual display devices of the VM that have corresponding active client display devices on the list, disables the rest of the virtual display devices of the VM, and configures the enabled virtual display devices based on the settings of the corresponding client display devices. In one embodiment, the VM display agent follows the settings of the client display devices only if such settings are supported by the virtual display devices of the VM.

At block 505, the VM display agent sends a notification to the remote display system that the display settings of the VM were configured based on the client display system data.

At block 506, the remote display system forwards the notification to the client. In one embodiment, the notification includes the current display settings of the VM. In another embodiment, the notification does not include the current display settings of the VM. Instead, the VM display agent sends the current display settings later (e.g., via the MODE operation) after the channel connections between the VM and the client display devices are established. In addition, during the active display connection, if the display settings of the VM are changed, the VM display agent can send the MODE operation message to the client, specifying the new display settings of the VM.

Figure 6:
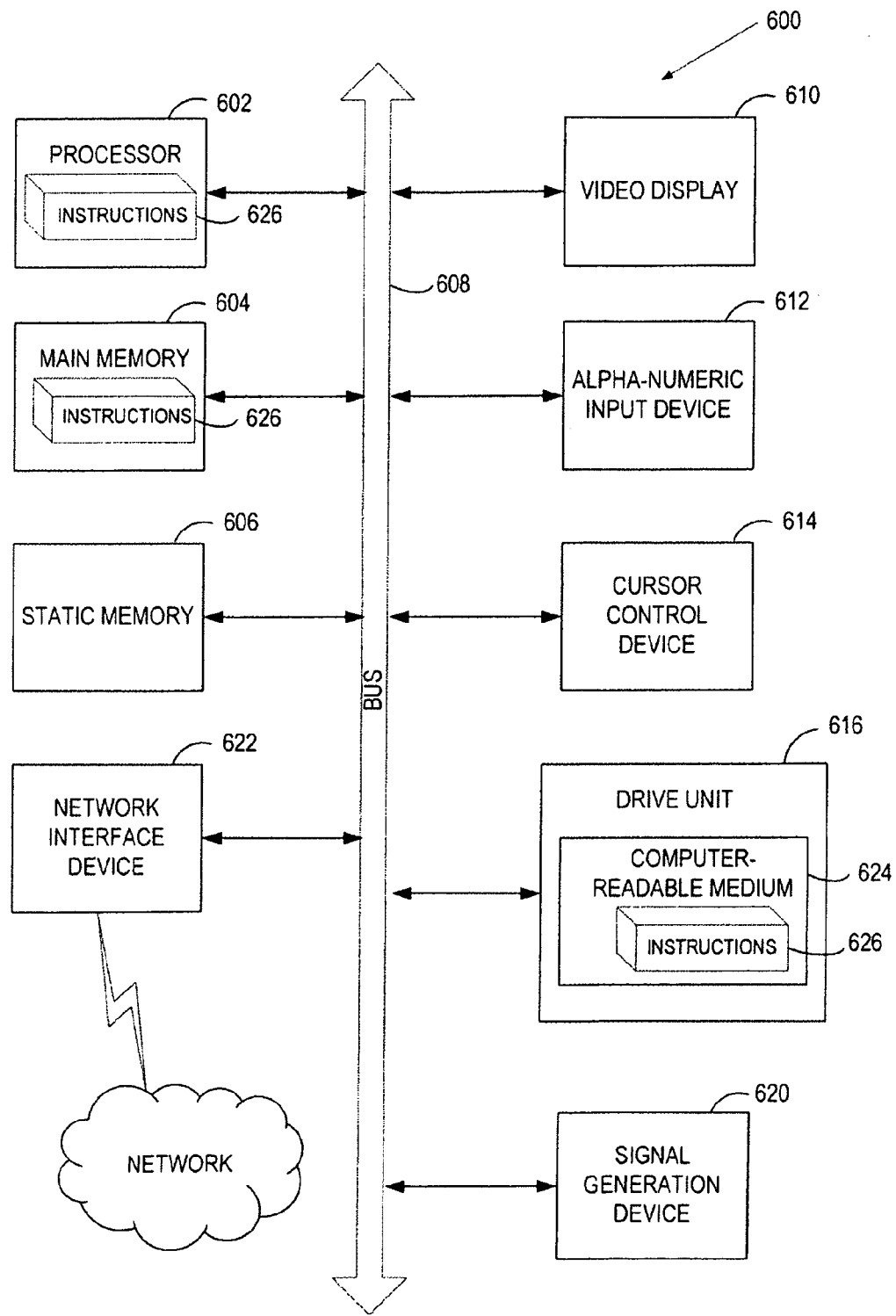
FIG. 6 illustrates a block diagram of one embodiment of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628 on which is stored one or more set of instructions (e.g., software 622) embodying any one or more of the methodologies of functions described herein. The software 622 may also reside, completely or at least partially, within the main memory 604 and/or within the processing device 602 during execution thereof by the computer system 600; the main memory 604 and the processing device 602 also constituting machine-accessible storage media. The software 622 may further be transmitted or received over a network 620 via the network interface device 608.

The machine-readable storage medium 628 may also be used to store instructions to configure display devices in a VM system as described in embodiments of the invention and implemented by system 100 of FIG. 1 or system 200 of FIG. 2, and/or a software library containing methods that call the above applications. While the machine-accessible storage medium 628 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method, comprising:
    identifying, by a client device, one or more physical display devices coupled with the client device;
    transmitting, by the client device, client display information to a host, the client display information comprising an identifier of each of the one or more physical display devices and current settings of each of the one or more physical display devices, the current settings of each of the one or more physical display devices specifying one or more properties of a respective physical display device, the host running one or more virtual machines (VMs), each VM having one or more virtual devices that emulate display device functionality for a corresponding VM, each of the one or more virtual devices being associated with one of the one or more physical display devices using a corresponding identifier in the client display information;
    receiving, by the client device, a notification from the host indicating that current settings of a virtual device of the one or more virtual devices of the corresponding VM have been modified based on the client display information, the notification including the current settings of the virtual device of the corresponding VM; and
    when the current settings of the virtual device of the corresponding VM differ from current settings of an associated physical display device, adjusting the current settings of the associated physical display device according to the current settings of the virtual device of the corresponding VM, prior to a communication between the corresponding VM and the associated physical display device.

2. The method of claim 1, wherein the client display information further identifies one or more alternative settings supported by each display device of the client.

3. The method of claim 1, further comprising adjusting the current settings of the associated physical display device according to the current settings of the virtual device of the corresponding VM after establishing a display connection between the corresponding VM and the client associated physical display device.

4. The method of claim 1, wherein the current settings include at least one of resolution, orientation, display position, color depth, and sub-pixel order.

5. The method of claim 1, further comprising:
    detecting a change in the settings of the client display devices during an active display connection between the corresponding VM and the client display device;
    sending changed settings of the client display devices to the corresponding VM; and receiving a notification from the corresponding VM indicating that the display information of the corresponding VM was configured based on the changed settings of the client display devices.

6. A computer-implemented method, comprising:

receiving, by a virtual machine (VM) running on a host computer, client display information comprising an identifier of each of one or more physical display devices of a client device remotely coupled to the host computer and one or more settings of each of the one or more physical display devices, the settings of each of the one or more physical display devices specifying one or more properties of a respective physical display device, the host VM having one or more virtual devices that emulate display device functionality for the VM, each of the one or more virtual devices being associated with one of the one or more physical devices using a corresponding identifier in the client display information;

configuring, by the VM, display device information of the VM based on the client display information, the display device information of the VM including settings of each of the virtual devices;

sending, by the VM, a notification that the display device information of the VM was configured based on the client display information, the notification including new display device information of the VM; and receiving changed settings of the client display devices from the client during a display connection, where the changed settings of the client display devices were adjusted according to the new display information of the VM prior to the display connection.

7. The method of claim 6, wherein the client display information further identifies one or more settings associated with each display device of the client.

8. The method of claim 7, further comprising disabling, by the VM, a virtual device of the VM if a corresponding client display device is not included in the client display information.

9. The method of claim 7, wherein configuring the display device information of the VM further comprises updating one or more settings of at least one virtual device of the VM with settings specified for a corresponding display device of the client.

10. The method of claim 7, wherein the settings specified for the corresponding client display device in the client display information include at least one of resolution, orientation, display position, color depth, and sub-pixel order.

11. The method of claim 6, further comprising:

adjusting the display information of the VM based on the changed settings of the client display devices; and sending a notification to the client indicating that the display information of the VM was adjusted based on the changed settings of the client display devices.

12. A method comprising:

receiving, by a device agent within a virtual machine (VM) hosted by a computer, data comprising an identifier of each of one or more physical display devices of the computer and one or more settings associated with each of the one or more physical display devices, the settings of each of the one or more physical display devices specifying one or more properties of a respective physical display device, the VM having one or more virtual devices that emulate display device functionality for the VM, each of the one or more virtual devices being associated with one of the one or more physical devices using a corresponding identifier in the received data;

determining, by the device agent within the VM hosted by the computer, whether display device settings of any of the virtual devices of the VM are different from the one or more settings associated with a corresponding physical display device associated of the computer;

if display device settings of one of the virtual devices of the VM are different from the one or more settings associated with a corresponding physical display device, replacing, by the device agent within the VM hosted by the computer, the display device settings of the one of the virtual devices of the VM with the one or more settings of the corresponding physical display devices of the computer; and providing a notification including new display device settings of the one of the virtual devices of the VM; and receiving changed settings of the corresponding physical display device during a display connection, wherein the changed settings of the corresponding physical display device were adjusted according to the new display device settings of the one of the virtual devices of the VM prior to the display connection.

13. The method of claim 12, wherein adjusting the display device settings of the VM comprises updating settings of one or more virtual devices of the VM with the one or more settings associated with the one or more display devices of the computer if the one or more settings associated with the one or more display devices are supported by the virtual devices of the VM.

14. The method of claim 12, wherein adjusting the display device settings of the VM comprises disabling a virtual device of the VM if a display device associated with the virtual device is not included in the received data.

15. The method of claim 13, wherein the received data contains a list of alternative settings.

16. The method of claim 15, wherein adjusting the display device settings of the VM comprises configuring one or more virtual devices of the VM using alternative settings supported by the virtual devices of the VM.

17. The method of claim 12, further comprising:

adjusting the display device settings of the VM based on the changed settings of the display device of the computer; and sending a notification indicating that the display device settings of the VM were adjusted based on the changed settings of the client display devices.

18. A system, comprising:

a processor;

a memory;

one or more physical display devices coupled to the processor and memory; and a virtual machine (VM) executed from the memory to virtualize the processor and memory and having one or more virtual devices that emulate display device functionality for the VM, the VM including a device agent operable to:

receive data comprising an identifier of each of one or more physical display devices of the computer and one or more settings associated with each of the one or more physical display devices, the settings of each of the one or more physical display devices specifying one or more properties of a respective physical display device, each of the one or more virtual devices being associated with one of the one or more physical devices using a corresponding identifier in the received data;

determine whether display device settings of any of the virtual devices of the VM are different from the one or more settings of a corresponding physical display device; and if display device settings of one of the virtual devices of the VM are different from the one or more settings of a corresponding physical display device, replace the display device settings of the one of the virtual devices of the VM with the one or more settings of the corresponding physical display devices of the computer, and provide a notification including new display device settings of the one of the virtual devices of the VM; and receive changed settings of the corresponding physical display device during a display connection, wherein the changed settings of the corresponding physical display device were adjusted according to the new display device settings of the one of the virtual devices of the VM prior to the display connection.

19. The system of claim 18, wherein the display devices are display devices of a client coupled to the processor and memory remotely.

20. The system of claim 19, wherein the client comprises a client display manager to create a list with display devices of the client and settings of the display devices of the client, to transmit the list to a host including the memory and the processor, and to receive a notification from the host indicating that display information of the VM was configured based on the list received from the client.

21. A non-transitory machine-readable storage medium including data that, when accessed by a client device, cause the client device to perform operations comprising:

identifying, by the client device, one or more physical display devices coupled with the client device;

transmitting, by the client device, client display information to a host, the client display information comprising an identifier of each of the one or more physical display devices and current settings of each of the one or more physical display devices, the current settings of each of the one or more physical display devices specifying one or more properties of a respective physical display device, the host running one or more virtual machines (VMs), each VM having one or more virtual devices that emulate display device functionality for a corresponding VM, each of the one or more virtual devices being associated with one of the one or more physical display devices using a corresponding identifier in the client display information;

receiving, by the client device, a notification from the host indicating that current settings of a virtual device of the one or more virtual devices of the corresponding VM have been modified based on the client display information, the notification including the current settings of the virtual device of the corresponding VM; and when the current settings of the virtual device of the corresponding VM differ from current settings of an associated physical display device, adjusting the current settings of the associated physical display device according to the current settings of the virtual device of the corresponding VM, prior to a communication between the corresponding VM and the associated physical display device.

22. A non-transitory machine-readable storage medium including data that, when accessed by a host computer, cause the host computer to perform operations comprising:

receiving, by a virtual machine (VM) running on the host computer, client display information comprising an identifier of each of one or more physical display devices of a client device remotely coupled to the host computer and one or more settings of each of the one or more physical display devices, the settings of each of the one or more physical display devices specifying one or more properties of a respective physical display device, the host VM having one or more virtual devices that emulate display device functionality for the VM, each of the one or more virtual devices being associated with one of the one or more physical devices using a corresponding identifier in the client display information;

configuring, by the VM, display device information of the VM based on the client display information, the display device information of the VM including settings of each of the virtual devices;

sending, by the VM, a notification that the display device information of the VM was configured based on the client display information, the notification including new display device information of the VM; and receiving changed settings of the client display devices from the client during a display connection, where the changed settings of the client display devices were adjusted according to the new display information of the VM prior to the display connection.

* * * * *